June 26, 1928.  1,674,778

H. N. GRESLEY

RAILWAY AND TRAMWAY VEHICLE

Filed July 30, 1927  5 Sheets-Sheet 1

Inventor
Herbert N. Gresley
By Cornwall, Bedell & Janney
Attys.

June 26, 1928.                    H. N. GRESLEY                    1,674,778
                          RAILWAY AND TRAMWAY VEHICLE
                             Filed July 30, 1927          5 Sheets-Sheet  2
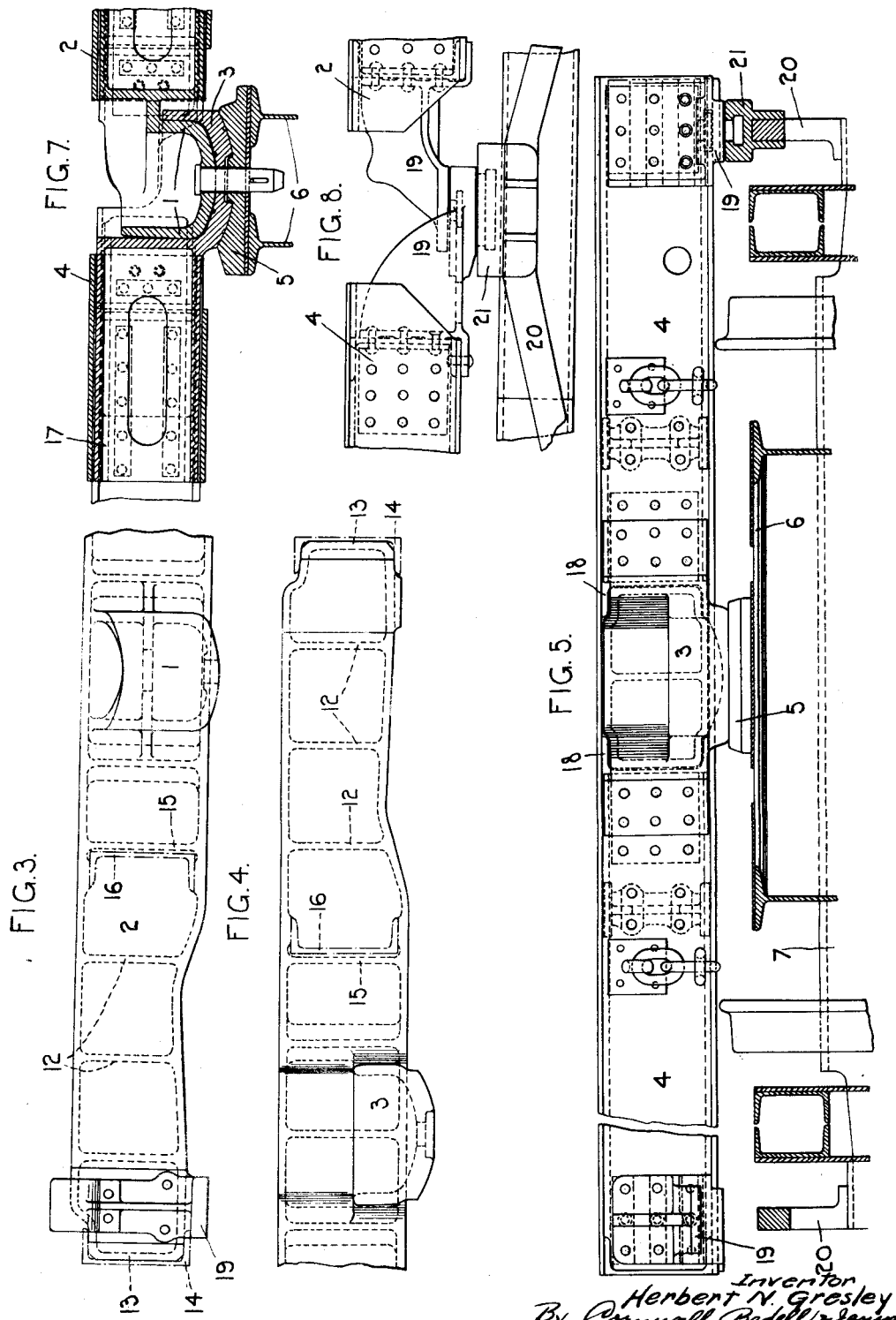

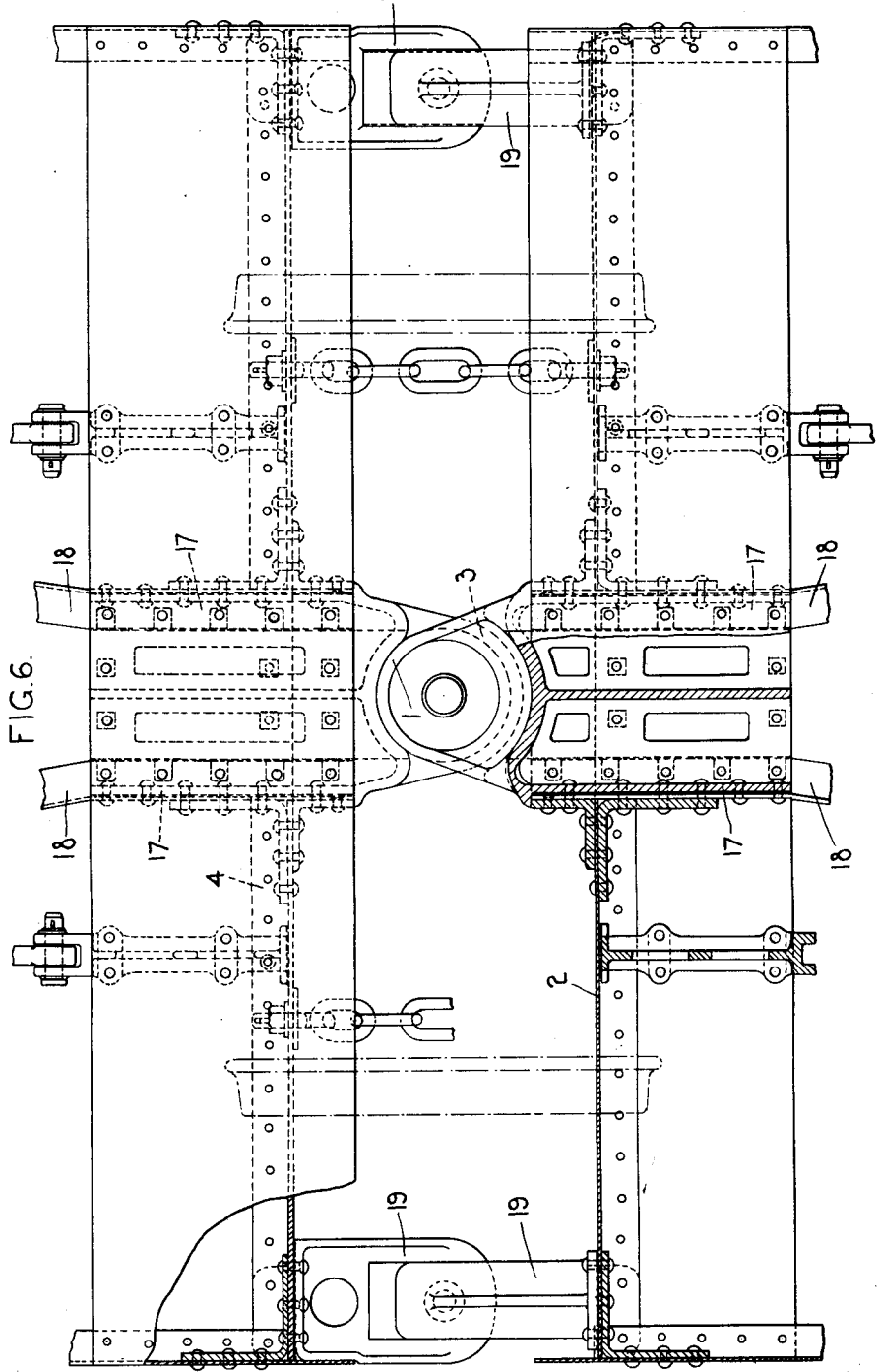

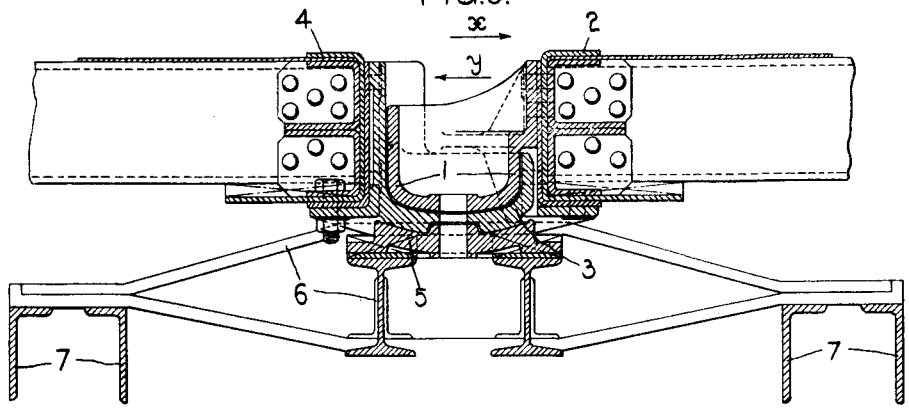
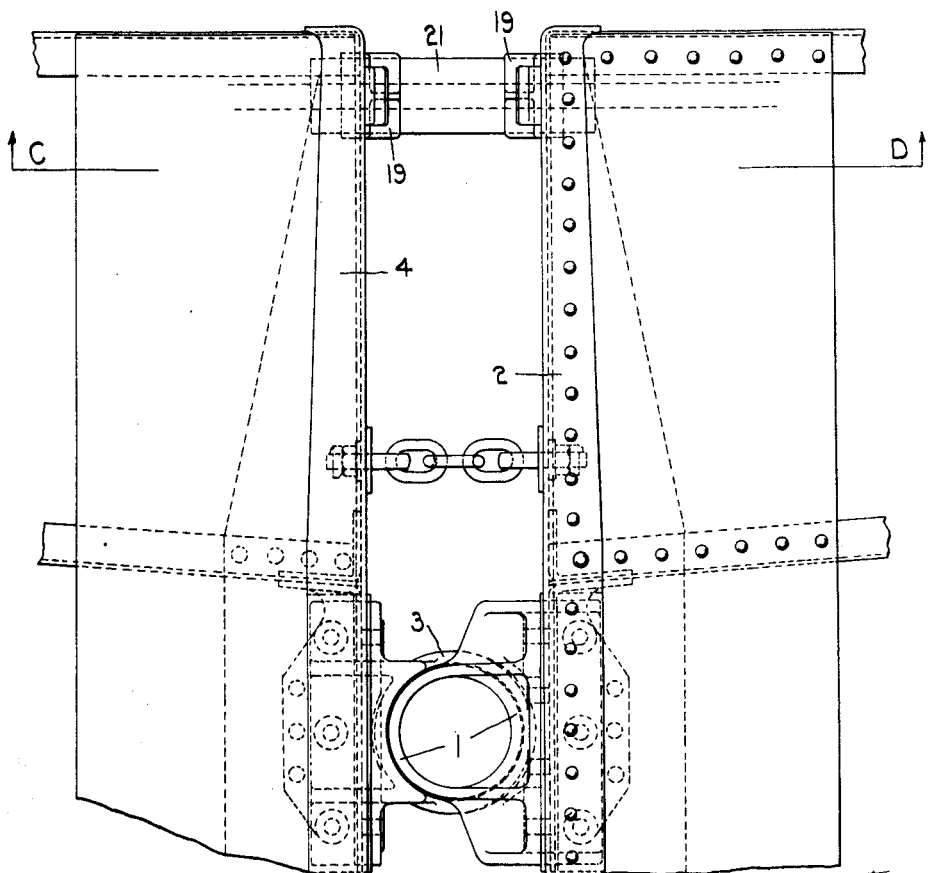

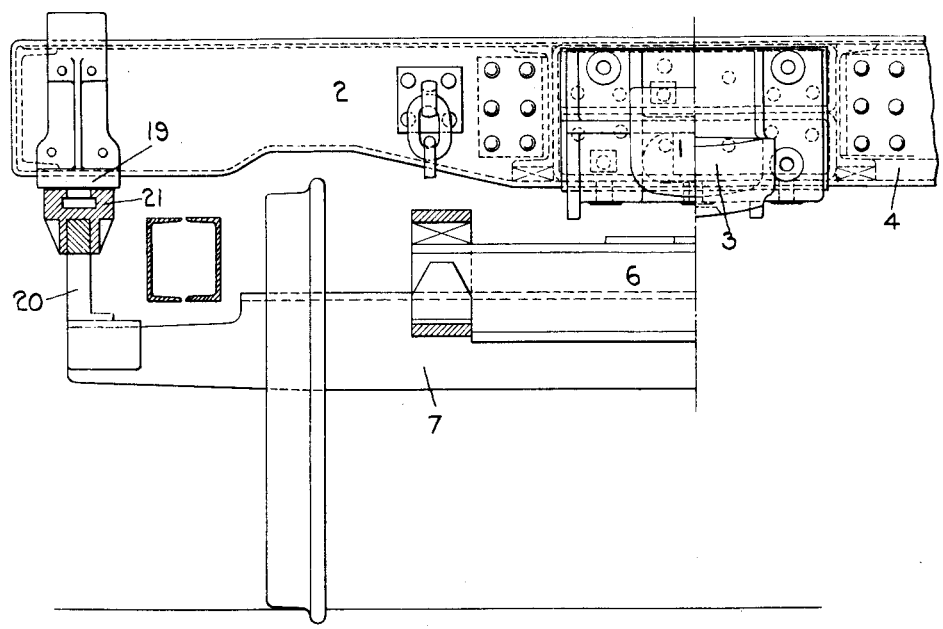
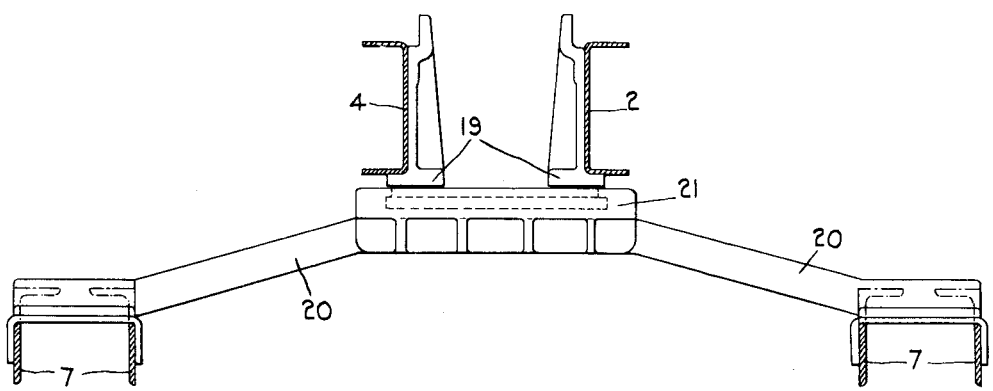

Patented June 26, 1928.

1,674,778

UNITED STATES PATENT OFFICE.

HERBERT NIGEL GRESLEY, OF HADLEY WOOD, ENGLAND, ASSIGNOR OF ONE-HALF TO THE LEEDS FORGE COMPANY LIMITED, OF LEEDS, ENGLAND.

RAILWAY AND TRAMWAY VEHICLE.

Application filed July 30, 1927, Serial No. 209,459, and in Great Britain October 11, 1926.

This invention has reference to articulated railway and tramway vehicles, that is to say to railway and tramway vehicles of the kind in which the adjacent ends of two vehicles are supported by one common bogie.

Mainly the invention relates to improved means whereby the centre articulation cups are attached to the underframes of the vehicles, the invention being particularly applicable to vehicles of great size and weight such as are, or may be, on account of their weight, carried on six-wheeled bogies. The invention is not however restricted in its application to such vehicles. The invention can be applied to lighter vehicles having their underframes carried on four wheel bogies at the articulated connection.

According to the invention the articulation cup members are formed with flanges or parts extending inwardly and rigidly fixed to longitudinal members of the underframes or formed in one with the head-stocks of the underframes of the vehicles.

In one construction the members of the articulation cup are directly attached as by bolts, rivets or welding to longitudinal members of the underframe and are formed integrally with the head-stocks of the said underframes. In such constructions the head-stocks can be either castings or forgings. In a further construction embodying the invention, parts, integral with the articulated cup members, pass through the head-stocks and are directly attached to longitudinal members of the underframes.

The invention also resides in improved arrangements of side bearing brackets as will be hereinafter described.

The accompanying illustrative drawings show various constructions according to the invention.

Figure 1:
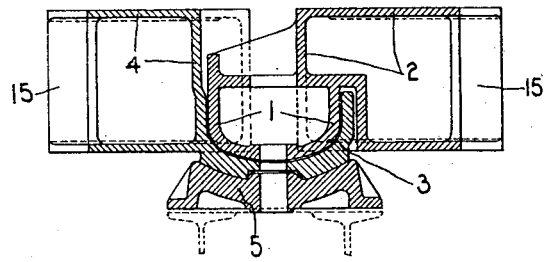
Figure 2:
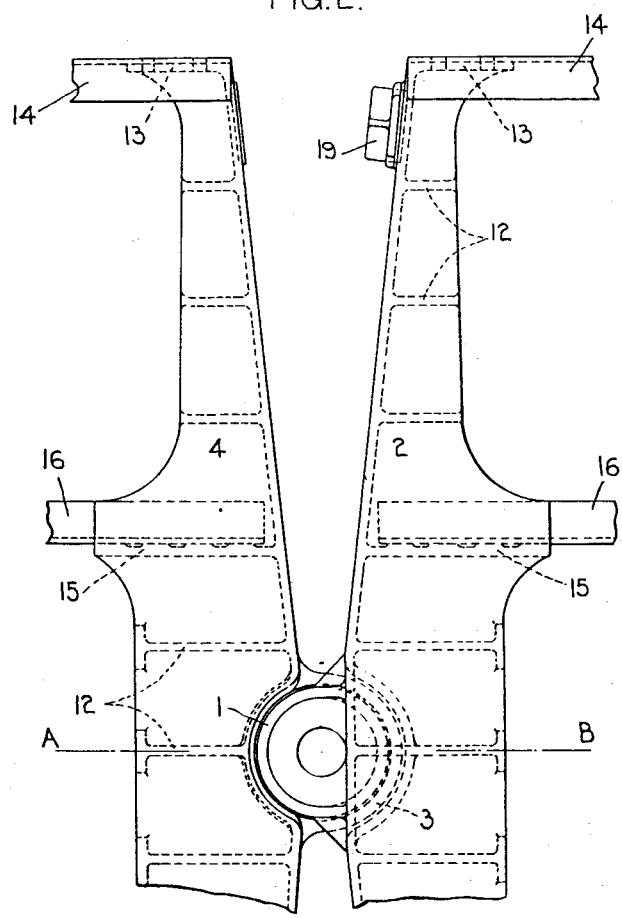

Figs. 1 to 4 inclusive illustrate a construction of cast steel head-stock embodying the invention, Fig. 1 being a section corresponding to the line A—B of Fig. 2, Fig. 2 being a plan, Fig. 3 an end view of one of the head-stocks, and Fig. 4 an end view of the other head-stock.

Figs. 5 to 8 inclusive illustrate an alternative construction, Fig. 5 being an end elevation, Fig. 6 a sectional plan, Fig. 7 a sectional elevation, and Fig. 8 an elevation showing the side bearing brackets.

Figs. 9 to 12 inclusive illustrate a construction and arrangement of side bearing brackets according to the invention, Fig. 9 being a central vertical longitudinal section through the coupling, Fig. 10 a plan, Fig. 11 an end elevation looking in the direction of the arrow $x$ in Fig. 9 as regards that part of the figure at the right hand side of the centre line, and looking in the direction of the arrow $y$ in Fig. 9 as regards that part of the figure at the left hand side of the centre line, and Fig. 12 being a vertical section corresponding to the line C—D of Fig. 10.

Referring to the construction illustrated in Figs. 1 to 4 inclusive, 1 indicates the male member of the centre articulation cup and 3 the female member thereof. 5 indicates the bottom centre pivot casting carried, as shown in other figures of the drawings, by a structure fixed to transverse members of the bolster of the supporting bogie. The two members 1 and 3 of the centre articulation cup, instead of being formed as separate members bolted to the faces of the underframe head-stocks, as in an already known construction, are formed integrally with the said head-stocks. In such a construction the head-stocks including the articulation cup members may be either castings or forgings as will be understood. The head-stocks 2 and 4 illustrated in Figs. 1 to 4 inclusive are made of cast steel of channel cross-section, the webs of the channel being connected at intervals by vertical webs 12. The face of each head-stock may be inclined outwardly from the central part where it merges into the articulation cup and each head-stock has at each end an inwardly extending web or arm 13 that is connected as by bolts, rivets or welding to the corresponding sole bar 14 of the underframe, and also other inwardly extending webs or arms 15 located towards the centre that are bolted, riveted or welded to the middle longitudinal members 16 of the underframe.

In an alternative construction, shown in Figs. 5 to 8 inclusive, the members of the centre articulation cup, instead of being merely attached to the underframe head-stocks, are each provided with arms 17, similar to the arms 15 of the construction shown in Figs. 1 to 4 except that the said arms are not integral with the head-stock. The said arms 17 extend through holes formed therefor through the head-stocks and are directly attached as by bolts, rivets, or welding, to the middle longitudinal members 18 of the underframe. If desired the ends of the said longitudinal members 18 may pass through and project beyond the head-stocks.

The adjacent ends of the articulated underframes are, or may be, provided with side bearing brackets such bearing brackets being made either as separate members 19 fixed to the head-stock, or made integrally with the head-stocks in cases where the head-stocks are made, say of cast steel. For example the head-stocks shown in Figs. 1 to 4 inclusive could have the bearing brackets cast in one therewith instead of, as shown, being made as separate members fixed thereto.

In the case of vehicles running on six-wheeled bogies, the side bearing brackets 19 on adjacent articulated head-stocks may each bear independently and directly on the lower side bearer of the bogie, the latter consisting of a beam 20, see Figs. 11 and 12, with or without a renewable wearing plate 21, extending longitudinally between the ends of the two transverse portions 7 of the bogie bolster. If preferred, as shown in Figs. 5 to 8 inclusive, the side bearing brackets 19 on the one head-stock may slide on the top of the bracket on the other head-stock, which bracket in its turn slides on the lower side bearer 20 of the bogie instead of each bracket sliding directly on the lower side bearer.

The bottoms of the head-stocks may be set up, as shown in Figs. 3, 4 and 11, at the points which are located vertically over the wheels of the bogie, so as to give sufficient working clearance.

Figures 9, 10 and 11 are included to show the arrangement of the side bearing brackets and they incidentally illustrate a method of attaching the articulated cup members to the head-stocks which does not form any part of the present invention.

It will be understood that in details of construction variations may be made without departure from the invention.

What I claim is:—

1. In railway and tramway vehicles of the kind hereinbefore referred to in which the adjacent ends of two vehicles are articulated together by means of cup-like members and supported by one common bogie, forming the articulation cup members with flanges or parts extending inwardly and rigidly fixed to longitudinal members of the underframe.

2. An arrangement according to claim 1 wherein parts integral with the articulation cup members pass through the head-stocks of the underframes and are directly attached to longitudinal members of the said underframes.

3. In a railway vehicle, a bogie having spaced cross bolsters and a bolster connecting member spaced from the center plate, underframing including adjacent head-stocks articulated together and supported on said bogie, and side bearing brackets on said head-stocks supported on said member.

4. In a railway vehicle, a bogie having a member spaced from the center plate, underframing including adjacent head-stocks articulated together and supported on said bogie, side bearing brackets on adjacent head-stocks, one of said brackets resting directly upon the other of said brackets and said latter bracket resting directly upon said member.

5. In a railway vehicle of the class described, a head-stock and a longitudinally extending frame member, a pivot bearing member extending forwardly of the face of said head-stock, and a rearward extension on said member rigidly attached to said frame member.

6. A railway vehicle one-piece casting adapted to be applied to a vehicle head-stock and having a forward projection for engaging a truck supported member and having a rearward projection for attachment to a longitudinally extending underframe member.

7. A railway vehicle one-piece casting adapted to be applied to a vehicle head-stock and having a forward projection for engaging a truck supported member and having spaced rearward projections for attachment to spaced underframe sills.

8. In combination, a railway vehicle head-stock and a member attached to said head-stock and including a cup-like bearing extending forwardly therefrom for seating on a truck supported element, and a projection on said member extending rearwardly of said head-stock for attachment to the car underframing.

9. In combination, a railway car head-stock having a horizontal transversely extending opening, and a member extending through said opening and provided with a bearing located forwardly of said head-stock for seating on a truck supported element, and provided with arms extending rearwardly of said head-stock for attachment to the car framing.

10. In combination, a railway car head-stock having a horizontal transversely extending opening, and a member extending through said opening and attached to said head-stock and provided with a bearing located forwardly of said head-stock for seating on a truck supported element, and provided with arms extending rearwardly of said head-stock for attachment to the car framing.

11. In combination, a railway car head-stock having a horizontal transversely extending opening, and a member extending through said opening and attached to the front and rear faces of said head-stock and provided with a bearing located forwardly of said head-stock for seating on a truck supported element, and provided with arms extending rearwardly of said head-stock for attachment to the car framing.

12. In combination, a railway car head-stock having a horizontal transversely extending opening, longitudinal underframe sills extending through said opening, and a member extending through said opening and provided with a bearing located forwardly of said head-stock and provided with elements for attachment to said sills.

13. In combination, a railway car head-stock having a horizontal transversely extending opening, longitudinal underframe sills extending through said opening, and a member extending through said opening and attached to said sills in front of and to the rear of said opening and provided with a cup-like bearing located in front of said head-stock.

14. In a railway vehicle, a bogie having a member spaced from the center plate, underframing including adjacent head-stocks articulated together and supported on said bogie, side bearing brackets on said adjacent head-stocks, one of said brackets resting directly upon the other of said member, said member including a renewable wear plate engaging the bracket resting thereon.

15. In combination, a railway car head-stock, a truck supported member in front of said head-stock and having a projection extending rearwardly thereof, and brackets in front of and behind said head-stock for connecting the later to said member.

16. In combination, a railway car head-stock having a transverse lateral opening, a truck supported member in front of said head-stock and including a projection extending through said opening to the rear of said head-stock, and brackets in front of and behind said head-stock for connecting said member to said head-stock at the sides of said opening.

17. In a railway vehicle, a bogie having a center member with side bearing elements spaced from the center plate, underframing including adjacent head-stocks articulated together and supported on said bogie, side bearing brackets on said adjacent head-stocks, one of said brackets resting directly on the other of said brackets and said latter bracket resting directly upon one of said side bearing elements.

18. In an articulated railway vehicle, head-stocks, longitudinal underframe members, a truck having a center plate element, an individual articulated bearing member projecting outwardly and inwardly from each of said head-stocks, the inwardly projecting portions of said bearing members being rigidly connected to said underframe members, the outer end of one of said bearing members resting directly on said center plate, and the outer end of the other of said bearing members resting directly on said first mentioned bearing member.

19. In an articulated railway vehicle, head-stocks, longitudinal underframe members, a truck having a center plate element, articulated bearing members extending through respective openings in said head-stocks and projecting outwardly and inwardly therefrom, the inwardly projecting portions of said bearing members being rigidly connected to said underframe members, the outer end of said bearing members resting directly on said center plate and the outer end of the other of said bearing members resting directly on said first mentioned bearing member.

20. A railway vehicle one-piece casting adapted to be applied to a vehicle head-stock and have a forward projection adapted to be supported by a truck center plate member and having a rearward projection for attachment to a longitudinally extending underframe member.

21. In a railway vehicle one-piece casting adapted to be applied to a vehicle head-stock and have a forward projection adapted to be supported by the forward projection of a similar casting on an adjacent head-stock, and having a rearward projection for attachment to a longitudinally extending underframe member.

22. In combination, a railway vehicle head-stock, and a member attached to said head-stock, and including a pivot bearing extending forwardly therefrom for seating on a truck center plate member, and including a projection on said member extending rearwardly of said head-stock for attachment to the car underframe.

23. In combination, a railway vehicle head-stock, and a member attached to said head-stock and including a pivot bearing extending forwardly therefrom for seating on a pivot bearing extending forwardly from a similar member on an adjacent head-stock, and including a projection extending rearwardly of said headstock for attachment to the car underframing.

24. An arrangement according to claim 1, wherein the articulated cup-like members are directly attached to longitudinal members of the underframes and to the head-stocks of said underframes.

25. In a railway vehicle, a bogie having spaced cross bolsters and a center bolster, articulated body frames having a common central support on said center bolster and having side bearings carried by said cross bolsters.

26. In a railway vehicle, a bogie having spaced cross bolsters and a center bolster, a side bearing beam mounted on said cross bolsters, and articulated body frames having a common central support on said center bolster and having side bearings supported on said beam.

In testimony whereof I affix my signature June 20, 1927.

HERBERT NIGEL GRESLEY.